(12) United States Patent
Batz et al.

(10) Patent No.: US 9,580,052 B2
(45) Date of Patent: Feb. 28, 2017

(54) METHOD FOR DECELERATING A VEHICLE

(71) Applicant: SIEMENS AKTEINGESELLSCHAFT, Munich (DE)

(72) Inventors: Ferdinand Batz, Erlangen (DE); Daniel Sturm, Fuerth (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 14/427,833

(22) PCT Filed: Sep. 9, 2013

(86) PCT No.: PCT/EP2013/068601
§ 371 (c)(1),
(2) Date: Mar. 12, 2015

(87) PCT Pub. No.: WO2014/040949
PCT Pub. Date: Mar. 20, 2014

(65) Prior Publication Data
US 2015/0251640 A1 Sep. 10, 2015

(30) Foreign Application Priority Data
Sep. 13, 2012 (DE) ........................ 10 2012 216 315

(51) Int. Cl.
*B60T 8/18* (2006.01)
*B60T 7/18* (2006.01)
*B60T 8/172* (2006.01)

(52) U.S. Cl.
CPC .............. *B60T 8/1893* (2013.01); *B60T 7/18* (2013.01); *B60T 8/172* (2013.01); *B60T 2250/02* (2013.01)

(58) Field of Classification Search
CPC ........... B60T 8/1893; B60T 7/18; B60T 8/172
See application file for complete search history.

(56) References Cited

U.S. PATENT DOCUMENTS

| | | | |
|---|---|---|---|
| 5,735,579 A | 4/1998 | Wood et al. | |
| 6,249,735 B1 | 6/2001 | Yamada et al. | |
| 6,314,383 B1 | 11/2001 | Leimbach et al. | |
| 6,633,006 B1 | 10/2003 | Wolf et al. | |
| 7,363,116 B2 | 4/2008 | Flechtner et al. | |
| 7,979,185 B2 | 7/2011 | Wolfgang et al. | |
| 2001/0018384 A1* | 8/2001 | Onimaru | F16H 61/21 477/118 |
| 2003/0154798 A1* | 8/2003 | Weyand | G01G 19/086 73/760 |
| 2009/0192664 A1 | 7/2009 | Wolfgang et al. | |
| 2010/0292875 A1 | 11/2010 | Gross | |

FOREIGN PATENT DOCUMENTS

| | | |
|---|---|---|
| CN | 101443636 | 5/2009 |
| DE | 3929497 A1 | 3/1991 |
| DE | 19728867 A1 | 1/1999 |
| DE | 19837380 A1 | 2/2000 |
| DE | 102006011963 B3 | 8/2007 |
| DE | 102006022171 A1 | 11/2007 |
| DE | 102006025329 B3 | 12/2007 |
| EP | 2029405 A1 | 3/2009 |
| WO | 03029764 A1 | 4/2003 |

* cited by examiner

*Primary Examiner* — Basil T Jos
(74) *Attorney, Agent, or Firm* — Laurence Greenberg; Werner Stemer; Ralph Locher

(57) ABSTRACT

In a method for operating a vehicle, a current total mass of the vehicle is determined depending on a tractive force applied to accelerate the vehicle and, depending on the determined current total mass of the vehicle, the vehicle is decelerated. The build-up and/or reduction of a brake force for decelerating the vehicle depends on its total weight.

8 Claims, No Drawings

METHOD FOR DECELERATING A VEHICLE

BACKGROUND OF THE INVENTION

Field of the Invention

The invention relates to a vehicle and a method for the operation of the vehicle.

DIN 13452-1 specifies a limit value for a change of acceleration during service braking of a rail vehicle for local passenger transport at 1.5 m/s³. Greater changes of acceleration are perceived by passengers as a jolt. In order to comply with the required jolt limit value, a change in brake force for an empty vehicle is set such that the jolt limit value is just reached. If the change in brake force is not adjusted depending on load, then the jolt will be below the limit value for a laden vehicle. A laden vehicle thus has a braking distance that is longer in comparison with an empty vehicle, even in the case of correction of the maximum brake force in proportion to the load weight.

BRIEF SUMMARY OF THE INVENTION

The object of the invention is to reduce the braking distance of a vehicle while simultaneously complying with a specified limit value for the change of acceleration during the deceleration process.

The object is achieved by the subject matter of the independent claims. Developments and embodiments of the invention are to be found in the features of the dependent claims.

DESCRIPTION OF THE INVENTION

A method according to the invention for the operation of a vehicle, in particular of a passenger rail vehicle, in particular for local passenger transport, comprises the process steps:
  Determining the current total weight of the vehicle depending on:
    an acceleration of the vehicle, and
    a tractive force expended for the acceleration of the vehicle;
  the build-up and/or reduction of a brake force for decelerating the vehicle depending on its total weight.

The acceleration of the vehicle results from the tractive force acting on the vehicle. The brake force is varied with time at least at the start and at the end of the deceleration process. The variation with time of the brake force takes place depending on the determined total weight of the vehicle. In particular, the brake force is built up and/or reduced during this so that a specified limit value for a jolt is not exceeded.

The total weight of the vehicle is the total weight of the vehicle at the point in time of the determination multiplied by the local acceleration due to gravity. The total weight is composed of the empty weight of the vehicle and the weight of the load. The acceleration is set arbitrarily.

Of course, other parameters can be taken into account when determining the total weight. Therefore according to a first development of the invention the determination of the total weight of the vehicle is carried out depending on external forces that act on the vehicle. These are in particular gravitational forces acting on the vehicle and/or frictional forces acting on the vehicle. External forces are also referred to as imposed forces.

The gravitational forces acting on the vehicle include in particular a downhill force acting on the vehicle. If the vehicle is on an inclined plane, an increased uphill force or a reduced downhill force is to be applied to the specified acceleration of the vehicle. Frictional forces are for example a rolling friction force acting on the vehicle and/or a flow resistance force acting on the vehicle.

The rolling friction force arises for example between the wheels of the vehicle and rails on which the vehicle is moving. In particular, when travelling around a turn said rolling friction force is increased, because a wheel flange of one or more wheels of the vehicle on the outside of the turn can strike against a side of a rail of the track on the outside of the turn on which the vehicle is moving through the turn. Even in the case of a straight track a wheel flange of a wheel of the vehicle can strike against a side of a rail of the track of the vehicle, in particular if the vehicle is lurching significantly. Both the downhill force and also the rolling friction depend on the total weight of the vehicle. The flow resistance of a vehicle depends by contrast on the speed of the vehicle relative to the air surrounding the vehicle. It is not dependent on the total weight of the vehicle.

For determining the downhill force and/or the rolling friction, the rail vehicle comprises for example a GPS receiver in order to determine the position of the rail vehicle. Track data with slope angles and/or turn radii are placed in a memory of the vehicle. Moreover, the vehicle comprises a computing unit for analyzing the track data. Alternatively, a slope sensor can also be provided for determining the slope and/or a lateral acceleration sensor is provided for determining the radius of a turn.

If a vehicle is accelerated from rest, initially a breakaway force must be overcome. It has developed that for determining the total weight of the vehicle the tractive force expended for the acceleration is determined during the acceleration of the vehicle from rest, in particular after the breakaway force has been overcome, for example after the vehicle has exceeded a specified minimum speed, e.g. 2 km/h. The determination of the tractive force expended for the acceleration finishes for example on reaching or exceeding a specified maximum speed or after a specified period of acceleration. A typical time window for this is for example 3.5 s. According to the development, said process is repeated for each new acceleration process from rest if vehicle doors have been opened when at rest. This enables the load of the vehicle to be changed. If the doors remain closed, the load of the vehicle does not usually change.

The tractive force expended for acceleration of the vehicle is determined in particular depending on the motor torque output by the drive motors of the vehicle. The drive torque of a drive motor can be read out for example using its motor current. Alternatively, the tractive force expended for acceleration of the vehicle is specified by the position of a control lever of the vehicle. The acceleration itself can arise from the change of the speed of a signal of a revolution rate meter on a drive of the vehicle.

If the total weight of the vehicle exceeds a specified threshold value, a signal can be output, in particular to the driver of the vehicle. Furthermore, the weight of the load can be calculated using the current total weight and may be output if the empty weight of the vehicle is known. Depending on the load, the number of transported passengers can be estimated and may be output. The empty weight is either specified or according to the invention is determined and placed in a memory with the vehicle in the empty state, for example when departing from the depot.

At the start and/or at the end of the deceleration process of the vehicle, a brake force for decelerating the vehicle is increased and/or reduced against time depending on its total weight, wherein the change with time of the brake force is within an interval with a specified constant magnitude, with a maximum value and a minimum value proportional to the maximum value as the limits of the interval, wherein the maximum value increases with a rising total weight of the vehicle. The difference between the maximum and minimum values is specified. The position of the interval is dependent on the total weight of the vehicle.

The aim is to select the change with time of the brake force for decelerating the vehicle such that the jolt, that is the change with time of the acceleration acting on the passengers, is held almost constant at the allowed maximum value, i.e. for example in a specified interval between 1.4 m/s³ and 1.5 m/s³. The minimum value of said specified interval is greater than zero in this case, the maximum value being taken from the standard for example.

The brake force is further increased and/or reduced approximately linearly against time during the braking process. The gradient of the linear brake force profile plotted against time is essentially proportional to the current total weight of the vehicle. It is in particular recalculated before each deceleration or after each determination of the total weight of the vehicle, i.e. in particular following a change of the total weight of the vehicle.

In order to implement the method according to the invention, a vehicle according to the invention, especially a rail vehicle for local passenger transport, comprises a computing unit that is suitable for and is suitably designed for calculating a current total weight of the rail vehicle depending on an arbitrary specified acceleration of the rail vehicle and on a tractive force expended for the acceleration of the rail vehicle. Moreover, the computing unit is suitable for calculating a brake force for decelerating the vehicle, in particular a variation with time of the brake force—a build-up and/or reduction of the brake force and accordingly an associated increase of the brake force and/or decrease of the brake force—depending on the total weight of the rail vehicle. The brake system of the rail vehicle is accordingly suitable for decelerating the rail vehicle depending on the current total weight of the rail vehicle calculated by the computing unit, and to apply the brake force calculated by the computing unit for this purpose, in particular to carry out the build-up and/or decrease against time of the brake force calculated by the computing unit.

The invention allows numerous embodiments. It is explained in detail using the following exemplary embodiment.

The current acceleration a of the vehicle with a specified minimum speed $v_{min}$ is obtained from:

$$a = \frac{F_Z - F_W - F_H - F_K}{m_{empty} * (1 - k_{rot}) + m_{load}}, \quad (1)$$

with the tractive force $F_z$, the running resistance $F_w$, the downhill force $F_H$, the turn resistance $F_K$, the empty weight $m_{empty}$, the load $m_{load}$ and the proportion of the rotating weights in the empty weight of the vehicle $k_{rot}$.

$v_{min}$ is in this case for example approximately 2-3 km/h. At a speed $v<v_{min}$ of the vehicle, the so-called breakaway force may have to be taken into account.

$F_W$ is dependent on the rolling friction $F_R=(m_{empty}+m_{load})*\mu*g*\sin \alpha$, with the coefficient of friction $\mu$, and on the flow resistance of the vehicle. The running resistance is dependent on the vehicle. The following applies for this approximately, being derived from the Davis formula:

$$F_W=(m_{empty}+m_{load})*(k_1+k_2*v)+k_3*v^2 \quad (2).$$

$k_1$ through $k_3$ are vehicle-specific running resistance constants that are determined for example in a rollout test or are simply estimated, v being the current speed of the vehicle. The coefficients are placed in a memory of the vehicle that is suitable for this.

By contrast, the following applies for $F_H$:

$$F_H=(m_{empty}+m_{load})*g*\sin \alpha \quad (3),$$

with g being the acceleration due to gravity and α being the slope angle of the track under the vehicle. $F_H$ is thus dependent on the current total weight of the vehicle. α is positive for a track rising in the direction of travel of the vehicle.

The turn resistance FK is for example dependent on the gauge, the total weight of the vehicle and the radius of the turn. It is to be neglected over straight starting distances after stopping points.

We thus get the following from equation (1)

$$m_{load}(a, v, F_Z, \alpha) = \frac{-a*m_{empty}*k_{rot} + F_Z - k_3*v^2}{a + k_1 + k_2*v - g*\sin\alpha} - m_{empty}. \quad (4)$$

The actual speed/current speed of the vehicle $v>v_{min}$ is determined for a known wheel diameter by means of a revolution rate encoder for example. Alternatively, GPS data can also be used for this purpose. Further methods for determining a speed of a vehicle are known and are included herewith. The acceleration a is then determined from this. The required tractive force $F_z$ is for example known from the deflection of a control lever. The slope angle α is to be read from a track database by using GPS data.

Of course, the formulas set out only apply up to a specifiable maximum speed $v_{max}\ll$the speed of light c, for example up to $v_{max}<1000$ km/h. A rail vehicle for local passenger transport normally reaches maximum speeds of less than 200 km/h.

In order to keep the jolt below a specified limit value, the deceleration of a rail vehicle is therefore initiated suitably slowly by only increasing the brake force slowly. Moreover, the deceleration is terminated slowly by reducing the brake force slowly on completion of the deceleration. By the method according to the invention, the brake force can be adjusted such that the deceleration takes place with a change of braking deceleration close to the limit value.

However, if the total weight of the vehicle is unknown, the deceleration is usually initiated and/or terminated by increasing and/or reducing the brake force such that the specified maximum value for the change of braking deceleration is only achieved for an empty vehicle, because the brake force is set for a known empty weight of the empty vehicle. But if the vehicle is loaded, whereby the weight of the vehicle is increased, the result thereof is an extension of the braking distance compared to braking when the specified limit value for the change of braking deceleration is achieved.

For the jolt R the following applies:

$$R = \frac{da}{dt}.$$

It is dependent on the total weight of the vehicle and on the change in brake force $dF_B/dt$. In order to keep the jolt constant, for example at a preferred $R_{max}=1.3$ m/s$^3$, the change in brake force with time must be adjusted depending on the load. Under the assumption that no significant changes of running resistance, downhill force or turn resistance occur during the build-up of brake force and/or during the decrease of brake force during the initiation and/or termination of a deceleration process, the following applies:

$$\frac{da}{dt} = \frac{-\frac{dF_B}{dt}}{m_{empty}*(1+k_{rot})+m_{load}}. \tag{5}$$

If the total weight of the vehicle has been determined, the change of the brake force with time can be adjusted such that the limit value $$R_{max} = \frac{da_{max}}{dt}$$

is achieved.

$$\frac{dF_B}{dt} = -\frac{da_{max}}{dt}*(m_{empty}*(1+k_{rot})+m_{load})$$

can be maintained for all deceleration processes until the doors are open and passengers disembark or embark and thus the load and therefore also the total weight of the vehicle changes.

The invention claimed is:

1. A method for operating vehicles, which comprises the steps of:
    providing a vehicle selected from the group consisting of rail vehicles and passenger carrying rail vehicles, the vehicle having rail vehicle brakes;
    determining a total weight of the vehicle depending on an acceleration of the vehicle, and a tractive force expended for the acceleration of the vehicle, the tractive force expended for the acceleration of the vehicle being determined in dependence on a motor current of a motor of the vehicle;
    determining at least one of a build-up brake force or a reducing brake force for decelerating the vehicle depending on the total weight;
    increasing or decreasing the brake force applied to the rail vehicle brakes linearly with time for decelerating the vehicle depending on the total weight, wherein a gradient is proportional to the total weight of the vehicle; and
    continuously monitoring the brake force to maintain the brake force within a specified interval.

2. The method according to claim 1, which further comprises determining the total weight of the vehicle in dependence on external forces acting on the vehicle.

3. The method according to claim 2, which further comprises determining the total weight of the vehicle in dependence on at least one of gravitational forces acting on the vehicle or frictional forces acting on the vehicle.

4. The method according to claim 1, wherein for determining a current total weight of the vehicle an empty weight $m_{empty}$ of the vehicle is known and a current load $m_{load}$ is calculated according to the following formula:

$$m_{load}(a,v,F_Z,\alpha) = \frac{-a*m_{empty}*k_{rot}+F_Z-k_3*v^2}{a+k_1+k_2*v-g*\sin\alpha} - m_{empty},$$

where:
a is an acceleration;
$F_Z$ is a tractive force;
$k_{rot}$ is a known component of a rotating weight of the empty weight of the vehicle;
v is a current speed of the vehicle;
α is a slope angle of a track;
g is an acceleration due to gravity; and
$k_1$ through $k_3$ are known vehicle-specific running resistance constants.

5. The method according to claim 1, wherein the build-up of the brake force and/or the reduction of the brake force for decelerating the vehicle takes place according to the following formula:

$$\frac{dF_B}{d} = -\frac{da_{max}}{dt}*(m_{empty}*(1+k_{rot})+m_{load})$$

where:
$m_{empty}$ is a known empty weight of the vehicle;
$k_{rot}$ is a known component of a rotating weight in an empty weight of the vehicle;
$m_{load}$ is a current load; and $$\frac{da_{max}}{dt}$$

is a specified jolt limit value.

6. The method according to claim 1, which further comprises performing the determining of the total weight of the vehicle during an acceleration process when the vehicle is at rest.

7. The method according to claim 1, which further comprises outputting a signal on exceeding a specified threshold value for a specified total weight of the vehicle.

8. A rail vehicle for local passenger transport, comprising:
    rail vehicle brakes; and
    a computer programmed for calculating a total weight of a rail vehicle depending on an acceleration of the rail vehicle and on a tractive force expended for the acceleration of the rail vehicle, the tractive force expended for the acceleration of the vehicle being determined in dependence on a motor current of a motor of the vehicle, and said computer is further programmed for calculating at least one of a build-up of a brake force or a reduction of the brake force applied to said rail vehicle brakes for decelerating the vehicle depending on the total weight of the vehicle, wherein a gradient for increasing or decreasing the brake force linearly with time for decelerating the vehicle is proportional to the total weight of the vehicle.

* * * * *